Patented Nov. 30, 1948

UNITED STATES PATENT OFFICE 2,454,886

PREVENTION OF MIST AND FROST ON GLASS AND SIMILAR SHEET MATERIAL

Reuben Hillel Sapiro, Pinner, England

No Drawing. Application May 17, 1943, Serial No. 487,383. In Great Britain April 16, 1942

Section 1, Public Law 690, August 8, 1946
Patent expires April 16, 1962

6 Claims. (Cl. 106—128)

This invention relates to the prevention of mist and frost on glass and similar sheet material. It is a common experience that visibility through glass and similar transparent sheet material such as sheets of transparent organic material as for example the windscreen of a motor car, becomes reduced by condensation of atmospheric moisture upon the surface of the transparent material; the disadvantage and even danger due to such a condition, especially on the windows of motor cars and aircraft, is of course obvious, especially when freezing of the condensed moisture occurs and it becomes more difficult to wipe it away.

More particularly the invention is concerned with the prevention or minimizing of mist and frost on glass and similar transparent sheet material by the adhesion thereto of a thin layer of transparent adhesive material so highly absorbent with respect to moisture as to take up the moisture particles as rapidly as they are being deposited and especially by using for this purpose a layer derived from a liquid adhesive compounded from a transparent gel-forming water-absorbent adhesive substance such as gelatin modified by the addition of a water-soluble acid such as acetic or salicylic acid, with or without additions in the form of a surface tension reducer or spreading agent such as saponin or sodium taurocholate or glycocholate. A convenient way of applying the aforesaid composite liquid is to apply it first to a film-like carrier such as a cellulosic sheet or film, cellulose regenerated from nitro-cellulose being particularly suitable. Such a treated sheet or film may be applied directly in its wet state to the glass or the like but one advantage of using the film-like carrier is that the adhesive treated carrier sheet or film can be dried and stored and is then ready for use at any subsequent time by merely dipping it in water or in a simple treating liquid and applying it to the surface of the glass or other transparent material required to be rendered mist or frost proof.

The present invention has for its chief object improvements in the efficiency of the adhesion of the applied sheet or film and in the nature of the pretreating liquid applied to the said sheet or film particularly as regards the wetting and softening properties of the said pretreating liquid.

The invention is applicable not only to ordinary sheet glass but also to other transparent synthetic material such for example as methacrylate resins. The sheet or film rendered adherent to the glass or similar synthetic transparent material may be any suitable transparent sheet material such as regenerated cellulose or viscose.

One feature of the present invention consists in the use of nitro-compounds, as for example nitro-glycerine and/or nitro-cellulose, as an essential component of an adhesive for securing the flexible sheet or film to the surface of the glass or other transparent material. The said nitro-compound is advantageously used in admixture with gelatine or glue in aqueous or alcoholic solution.

A further feature of the invention consists in using an adhesive mixture of glue or gelatine with a nitro-compound or nitro-compounds as above stated in a homogeneous state by the incorporation in the mixture of a homogenizing agent for which purpose a normally liquid monobasic aliphatic acid, especially acetic acid, is suitable, with or without other materials as for example alcohol, acetone, nitro-glycerine (if not used as an adhesive component proper), glycerine, ethylene glycol, camphor, and surface tension reducers, singly or in any suitable grouping.

Among the advantages of a high degree of homogeneity in the adhesive mixture used may be mentioned improved adhesion of the adherent transparent sheet, improved optical clarity of the sheet so applied, and the avoidance of separation or segregation of the two main components of the adhesive mixture during storage or while it is being applied to the viscose or regenerated cellulose sheet whether this application is being done at one particular temperature or not.

A further feature of the present invention consists in the provision of an improved treating liquid for wetting and softening the transparent flexible sheet or film just prior to its application to the glass or other surface, the said liquid containing essentially for this purpose an aqueous solution of a water-soluble ester or ether of glycol and/or glycerine and/or an ester or ether of glycerine. A particularly useful wetting and softening composition is an aqueous solution of diethylene glycol mono-butyl ether and/or diethylene glycol mono-ethyl ether acetate with or without glycol and/or glycerine and/or a penetrant such as a sulphonated ester of oleic acid. Water soluble acid may or may not be added.

The following is an example of the improved mixture for application to a flexible transparent sheet or film to form a non-misting and non-frosting material for application to glass and similar material in accordance with the present invention:

| | | |
|---|---|---|
| Gelatin | gms | 40 |
| Nitro-cellulose | gms | 1–5 |
| Glacial acetic acid | cc | 250–400 |
| Sodium choleate | gms | 10–15 |
| Water | cc | 100–150 |
| Industrial methylated spirit (64 O. P.) | cc | 600–750 |

In addition to the above constituents a small proportion, say 1 to 5 grams, of salicylic acid may be used not only for its acidic property but also for its preservative qualities, the said acid being preferably worked into the gelatin during the preliminary soaking of the gelatin in some of the water.

The following is an example of the wetting and softening liquid composition according to the present invention:

| | | |
|---|---|---|
| Water | cc | 200 |
| Glycerine | cc | 10–50 |
| Sulphonated ester of oleic acid (see above) | cc | 1–20 |
| Diethylene glycol monobutyl ether | cc | 1–20 |

This same composition may also be used as a reviver of the anti-misting and anti-frosting properties of the used sheet or film after a lapse of time.

What I claim is:

1. An article of manufacture for use in rendering the surface of glass and similar synthetic transparent material non-misting and non-frosting by application thereto, said article consisting of a thin dry flexible transparent sheet material carrying an adhesive composition capable of being activated by wetting and comprising essentially gelatin and nitro-cellulose.

2. An article of manufacture for use in rendering the surface of glass and similar synthetic transparent material non-misting and non-frosting by application thereto, said article consisting of a thin dry flexible sheet of regenerated cellulose carrying an adhesive composition capable of being activated by wetting and comprising essentially gelatin and nitro-cellulose.

3. An article of manufacture for use in rendering the surface of glass and similar synthetic transparent material non-misting and non-frosting by application thereto, said article consisting of a thin dry flexible transparent sheet material carrying an adhesive composition capable of being activated by wetting and comprising essentially gelatin, nitro-cellulose and acetic acid.

4. An article of manufacture for use in rendering the surface of glass and similar synthetic transparent material non-misting and non-frosting by application thereto, said article consisting of a thin dry flexible transparent sheet material carrying an adhesive composition capable of being activated by wetting and comprising essentially gelatin, nitro-cellulose, acetic acid and a surface tension reducer.

5. For use in treating a transparent cellulosic film for adhesive application to sheet glass and similar transparent rigid material to render it non-misting and non-frosting, a liquid composed of gelatin 40 grams, nitro-cellulose 1 to 5 grams, glacial acetic acid 250 to 400 ccs, sodium choleate 10 to 15 grams, water 100 to 150 ccs, industrial methylated spirit 600 to 750 ccs.

6. A liquid according to claim 5, containing also about 1 to 5 grams of salicylic acid.

REUBEN HILLEL SAPIRO.

REFERENCES CITED

The following references are of record in the file of this patent:

UNITED STATES PATENTS

| Number | Name | Date |
|---|---|---|
| 2,368,583 | Tage | Jan. 30, 1945 |
| 2,313,570 | Nadean et al. | Mar. 9, 1943 |
| 2,292,097 | Vollmer | Aug. 4, 1942 |
| 2,139,866 | Strouts | Dec. 13, 1938 |
| 2,118,262 | McGrady et al. | May 24, 1938 |
| 2,101,472 | Kormann | Dec. 7, 1937 |
| 1,988,584 | Dana et al. | Jan. 22, 1935 |
| 1,977,545 | Elbel | Oct. 16, 1934 |
| 1,943,268 | Fleischer | Jan. 9, 1934 |
| 1,900,540 | Broderick | Mar. 7, 1933 |
| 1,865,497 | Atwood | July 5, 1932 |
| 1,705,453 | Demaret | Mar. 12, 1929 |
| 1,466,888 | Morrissey | Sept. 4, 1923 |
| 1,369,708 | Roberts | Feb. 22, 1921 |
| 1,213,368 | Hibbert | Jan. 23, 1917 |

FOREIGN PATENTS

| Number | Country | Date |
|---|---|---|
| 320,374 | Great Britain | Oct. 7, 1929 |
| 2,694 | Great Britain | 1887 |
| 300,681 | Germany | Sept. 9, 1919 |